United States Patent [19]

Puranen

[11] Patent Number: 5,490,548
[45] Date of Patent: Feb. 13, 1996

[54] METHOD AND APPARATUS FOR CONTROLLING VENEER LATHE KNIFE CLEARANCE ANGLE

[75] Inventor: Jussi E. T. Puranen, Coquitlam, Canada

[73] Assignee: Durand-Raute Industries Ltd., New Westminster, Canada

[21] Appl. No.: 374,185

[22] Filed: Jan. 18, 1995

[30]       Foreign Application Priority Data

Jan. 18, 1994 [FI] Finland ..................................... 940239

[51] Int. Cl.$^6$ ................................ B27B 1/00; B27L 5/00; G08B 21/00
[52] U.S. Cl. ............................ 144/356; 73/579; 73/660; 82/118; 144/209 R; 144/365; 144/211; 144/213; 340/683; 364/474.09
[58] Field of Search ....................... 73/759, 660; 82/118, 82/117; 144/209 R, 211, 212, 213, 356, 357, 365; 364/474.02, 474.09; 340/680, 683

[56]              References Cited

U.S. PATENT DOCUMENTS

| | | |
|---|---|---|
| 4,392,519 | 7/1983 | Calvert . |
| 4,494,588 | 1/1985 | Berry et al. .............................. 144/209 |
| 4,558,311 | 12/1985 | Forsgren et al. . |
| 4,791,970 | 12/1988 | Walser et al. . |
| 5,143,129 | 9/1992 | Toivio . |

FOREIGN PATENT DOCUMENTS

WO91/08879 6/1991 WIPO .

*Primary Examiner*—W. Donald Bray
*Attorney, Agent, or Firm*—Oyens Wiggs Green & Mutala

[57] ABSTRACT

A method of controlling the clearance angle of a veneer lathe knife in a veneer lathe having a knife holder beam rotatably mounted on a knife carrier. The beam's vibration frequency is continuously measured and compared with a stored representation of a vibration frequency range (about 50–200 Hz.) characteristic of disruption of the veneer peeling operation. If the comparison reveals that the measured vibration frequency is within the characteristic disruptive range, the beam is rotatably adjusted until the comparison reveals that the measured vibration frequency no longer lies within the disruptive range. Usually, the adjustment accelerates lowering of the beam in order to make the knife clearance angle less positive.

6 Claims, 3 Drawing Sheets

METHOD AND APPARATUS FOR CONTROLLING VENEER LATHE KNIFE CLEARANCE ANGLE

FIELD OF THE INVENTION

A method of controlling the clearance angle of a veneer lathe knife; and, a veneer lathe controller implementing said method.

BACKGROUND OF THE INVENTION

The present invention relates to real time control of the clearance angle of a veneer lathe knife during the veneer peeling operation. More particularly, the knife clearance angle is continuously controlled as the diameter of the rotating block decreases, in a manner which reduces disruption of the veneer peeling operation.

In a conventional veneer lathe, the knife holder beam which supports the knife and the knife backing element (called the "nose bar") are mounted on a carrier such that the beam may rotate, relative to the carrier, about an axis which is aligned essentially coincident with the knife's cutting edge. Such rotatability is achieved by using bearings to hingedly mount the beam onto the carrier. The outer bearing races are mounted to the end posts of the carrier, with the beam being supported at its ends by the inner bearing races, so aligned that the tip of the knife is situated at the center of the bearings.

To control the angle of the beam relative to the carrier, a hydraulic or pneumatic actuator is mounted between these knife support elements so that they may be controllably rotated relative to one another. The specific actuator used may be selected from a group of different eccentric, screw or hydraulic actuators. For example, one may employ a hydraulic actuator having a single-stroke cylinder whose piston is arranged to urge the massive knife holder beam against gravitation to the start position of the veneer peeling operation and from which position the beam is then allowed to rotate backward by gravitation in a controlled manner by reducing the pressure in the hydraulic cylinder. Such an apparatus is described in, e.g., U.S. Pat. No. 5,143,129.

Control of the above-described hydraulic actuator cylinder is conventionally implemented by a microprocessor-based controller which continuously compares the actual tilt angle of the knife holder beam with the angle the beam should ideally have as the beam and knife are incrementally advanced during the peeling operation. The controller's memory stores a plurality of different, experimentally determined control curves, one for each wood species to be handled by the veneer lathe in question. Each curve comprises a sequence of set points, with each set point defining the ideal knife holder beam tilt angle for the particular wood species at a particular diameter of the block. If the actual value of the knife tilt angle lags behind the set point which defines the ideal angle for the particular wood species and block diameter, then a control signal is applied to the hydraulic actuator cylinder to controllably reduce the cylinder pressure until the actual value of the knife tilt angle becomes, within the tolerance of the control system, equal to the desired set point.

The above-described prior art control system operates satisfactorily, provided that parameters such as wood density, moisture and temperature of the block do not differ significantly from the corresponding parameters prevailing during generation of the experimentally determined control curves. Significant deviation of such parameters can affect the ideal knife tilt angle and disrupt the veneer peeling operation, necessitating prompt manual corrective intervention by the lathe operator, who typically reacts, based upon experience, by changing the knife clearance angle to make it more negative.

If the knife clearance angle is allowed to become excessively positive then vibrations may occur in the knife. These vibrations, which are transmitted to other parts of the lathe, have been found to have a frequency in the range of about 50–200 Hz. The onset of such vibration in the lathe is a clear indication that the knife clearance angle is excessively positive and should be reduced. The present invention detects the onset of such vibration and initiates appropriate control action to minimize disruption of the veneer peeling operation.

SUMMARY OF THE INVENTION

In accordance with the preferred embodiment, the present invention monitors lathe vibration. Upon detection of the onset of vibration within the aforementioned 50–200 Hz. frequency range, the rotation rate of the knife holder beam is accelerated in the direction required to make the knife clearance angle less positive. The accelerated rotation rate is sustained until the vibrations in the monitored frequency range die out. The technique may be used with or without a control system like that described above in which the lathe controller's memory stores a plurality of different, experimentally determined control curves to initially govern the peeling operation.

BRIEF DESCRIPTION OF THE DRAWINGS

The invention will now be described in greater detail, with reference to the accompanying drawings, in which.

DETAILED DESCRIPTION OF THE PREFERRED EMBODIMENT

Figure 1:
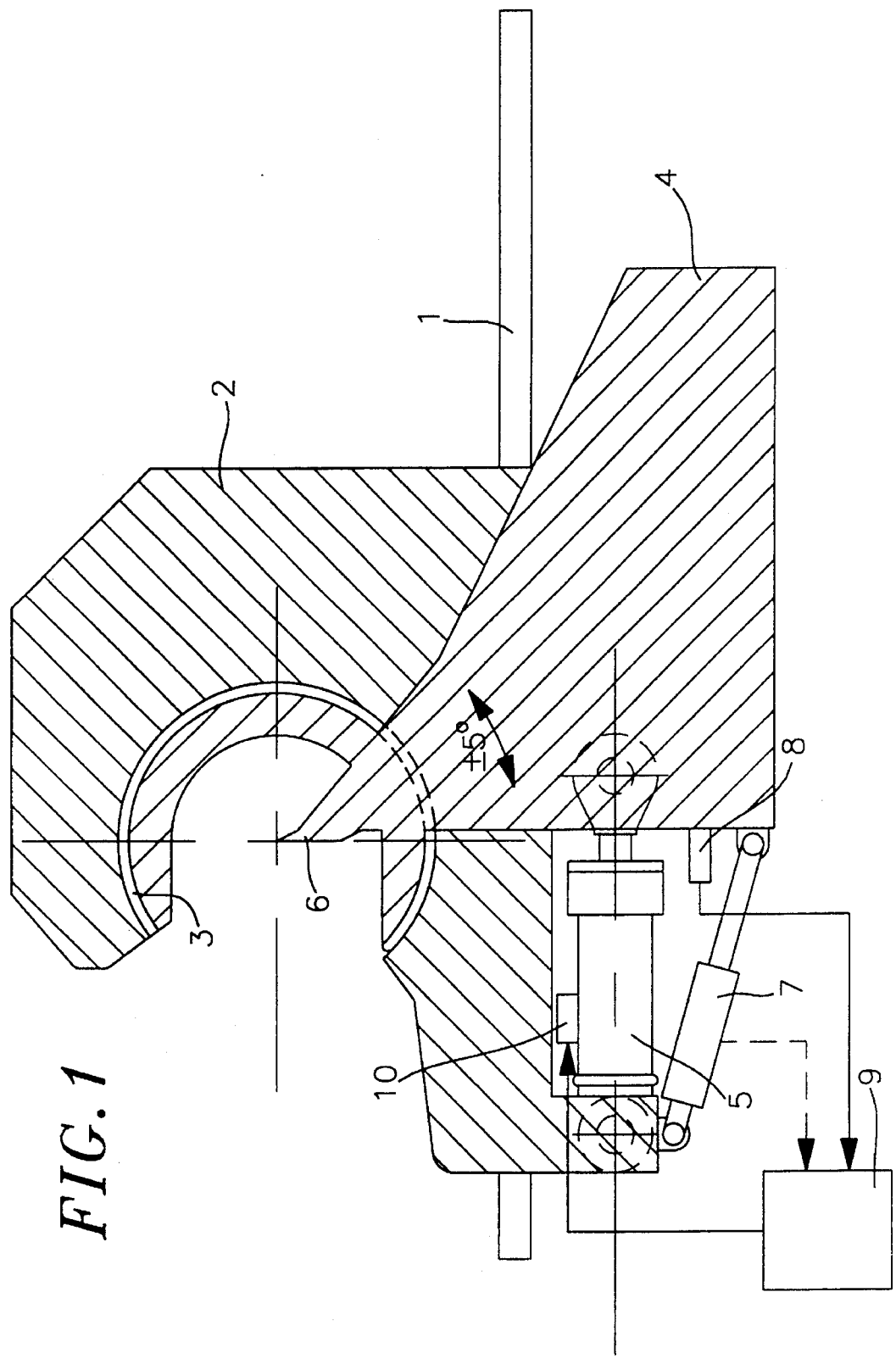
FIG. 1 is a schematic representation of a veneer lathe and controller according to the invention.

With reference to FIG. 1, a veneer lathe knife carrier is slidably mounted on guides 1 for horizontal movement toward or away from a peel block (not shown). Vertical side posts 2 are mounted at each end of the knife carrier. Sleeve bearings 3 are in turn mounted on the respective side posts to support knife holder beam 4. Sleeve bearings 3 and knife holder beam 4 are aligned so that the peeling line defined by the tip of knife 6 is superimposed on the sleeve bearings' longitudinal axis.

Knife holder beam 4 is rotated relative to knife carrier 2 by hydraulic cylinder 5. As depicted in FIG. 1, knife holder beam 4 is a relatively massive structure. Beam 4 is initially rotated upwardly against gravitation, by extending cylinder 5, to position knife 6 to start the veneer peeling operation (the initial position depends upon the diameter of the peel block). In this initial position beam 4 possesses an essential amount of potential energy.

As the peeling operation proceeds, the pressure in cylinder 5 is gradually reduced, allowing beam 4 to lower by gravitation in a controlled manner which maintains the desired knife clearance angle. More particularly, beam 4 is allowed to lower such that, as the block diameter reduces, the knife clearance angle follows the path depicted in FIG. 2.

A transducer 7 is mounted between beam 4 and knife carrier 2 to produce an output signal representative of the instantaneous knife clearance angle as the block diameter reduces. The output signal is fed to microprocessor-based controller 9, which compares the signal with a stored representation of the desired knife clearance angle for the particular block diameter. If the comparison reveals significant variation between the measured and desired angles, then controller 9 outputs a signal to valve 10 on cylinder 5 to retard or accelerate the reduction of pressure in cylinder 5 and thereby adjust the knife clearance angle toward the desired value.

A bandpass-type vibration detector 8 is mounted on knife holder beam 4. Detector 8 produces an output signal representative of instantaneous vibration of beam 4. The signal output by detector 8 is fed to a microprocessor-based controller 9, which compares the vibration signal with a stored representation of vibrations in the 50–200 Hz range characteristic of disruption of the peeling operation. If the comparison reveals the onset of such disruptive vibration in beam 4, then controller 9 outputs a signal to valve 10 on cylinder 5 to retard or accelerate the reduction of pressure in cylinder 5 and thereby adjust the knife clearance angle toward the desired value. Usually, the output signal commands valve 10 to open more to accelerate the release of hydraulic fluid from cylinder 5 and thus accelerate reduction of the force exerted by cylinder 5 which in turn accelerates lowering of beam 4. This results in accelerated change of the knife clearance angle to yield a less positive value of that angle. The output signal is maintained as aforesaid until the comparison effected by controller 9 reveals that vibrations in the 50–200 Hz range characteristic of disruption of the peeling operation have died out.

The vibration monitoring technique aforesaid is maintained throughout the veneer peeling operation, with cylinder 5 being activated immediately whenever controller 9 detects the onset of vibrations in the 50–200 Hz range characteristic of disruption of the peeling operation.

According to an alternative embodiment of the invention, controller 9 may be suitably programmed to continuously determine the maximum usable positive value of knife clearance angle as the block diameter reduces and thereby retard lowering of the knife carrier up to the onset of vibrations, after which the lowering rate is further adjusted so that vibrations are just marginally avoided.

As mentioned above, cylinder 5 may be controlled on the basis of a pre-defined beam lowering rate determined experimentally for the wood species to be peeled. The predefined beam lowering rate can then be instantaneously modified as required during peeling of any particular block on the basis of the vibration information provided to controller 9 by detector 8. Alternatively, one may perform the knife clearance angle control adjustment entirely on the basis of information received by controller 9, without reference to any a priori determination of the desired knife clearance angle.

Vibration detector 8 may be placed at different locations within the veneer lathe, but placement directly on knife holder beam 4 has been found to yield optimal information respecting changes in the vibration status of knife 6.

Figure 2:
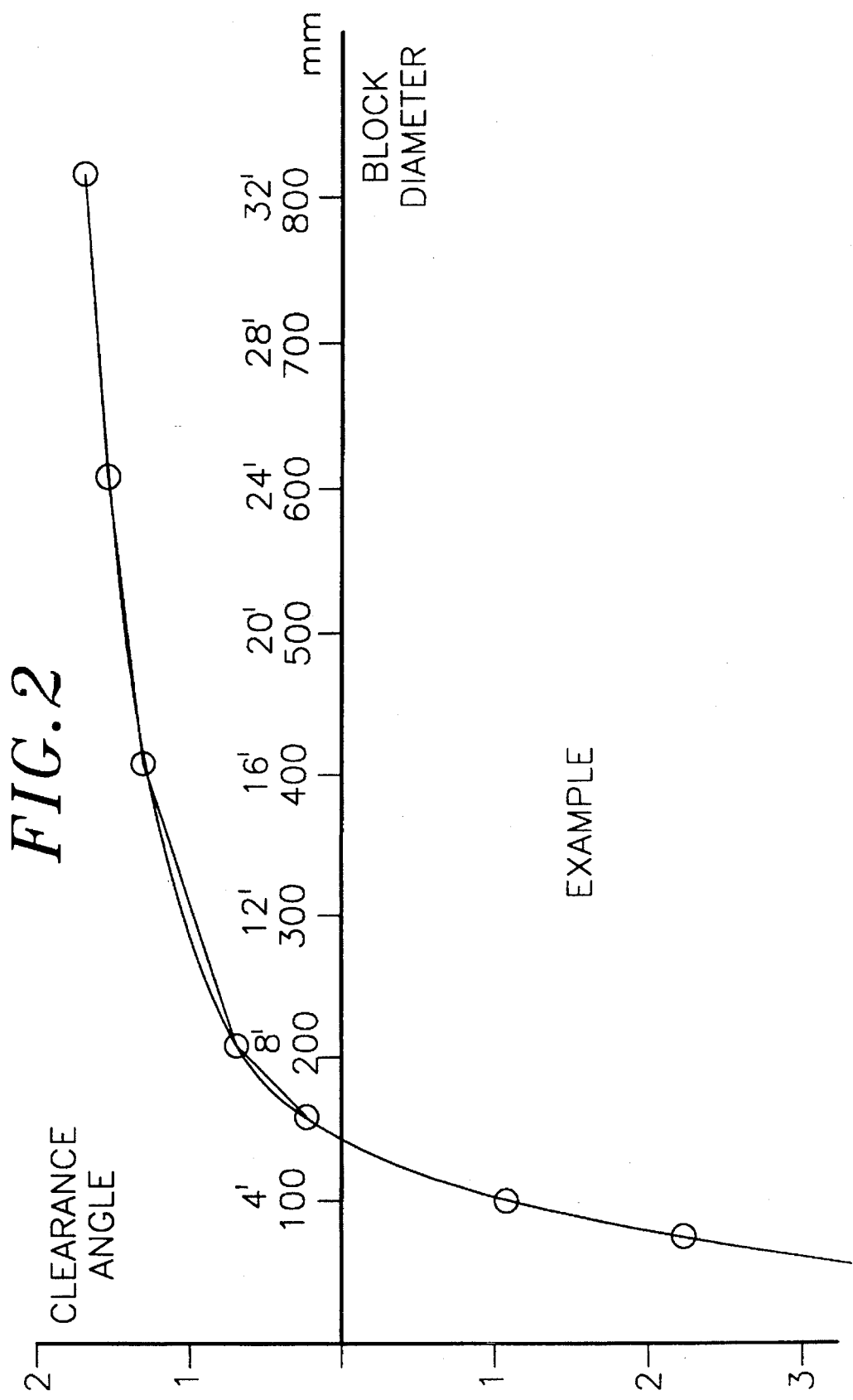
FIG. 2 is a graph illustrating the typical shape of an experimentally determined control curve defining veneer lathe knife clearance angle as a function of block diameter for a particular wood species; and, FIG. 3 is a schematic depiction of a block, knife and nose bar, illustrating certain technical terms employed in this application.

With reference to FIG. 2, the typical shape of an experimentally determined control curve is shown for a particular wood species of a particular wood density, moisture and temperature. The rightmost part of the curve shows initial values of knife clearance angle, at the start of peeling a block of a particular diameter. The leftward part of the curve shows how the clearance angle ideally changes during peeling, as a function of the block's reducing diameter. At larger block diameters the clearance angle is more positive, approaches zero as the block diameter reduces, and becomes negative when the block diameter drops below a certain limit.

Figure 3:
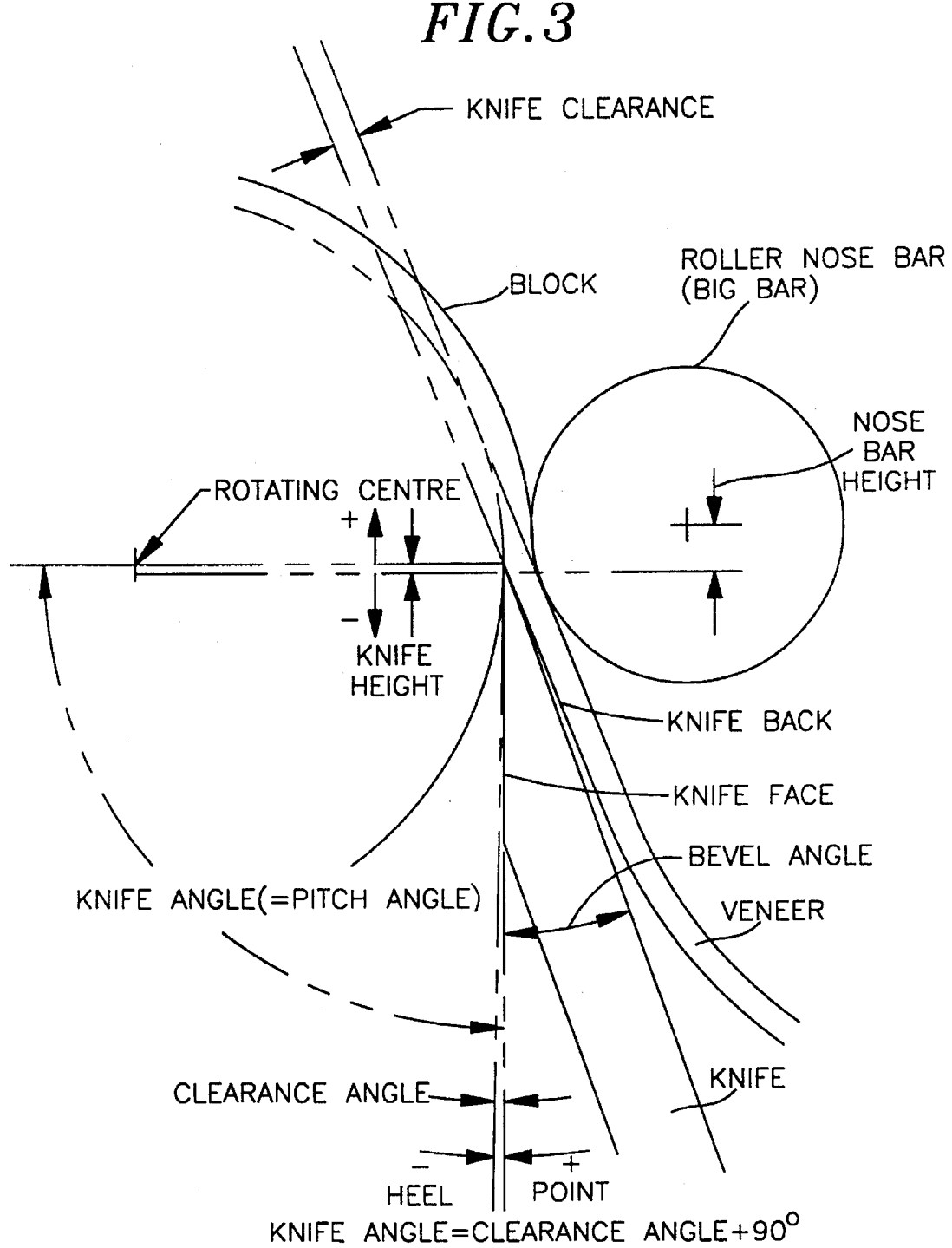

FIG. 3 illustrates the meaning of the term "clearance angle" and other basic terminology which will be familiar to those skilled in the art. As shown in FIG. 3, the knife clearance angle, which is crucial to understanding of the present invention, is defined as the angle by which the plane of the knife's cutting face deviates from a plane tangential to the block being peeled.

As will be apparent to those skilled in the art in the light of the foregoing disclosure, many alterations and modifications are possible in the practice of this invention without departing from the spirit or scope thereof. For example, the invention has been described in the context of a veneer lathe having rotating spindles for mounting the block. However, the invention is also suited for use with so-called "spindleless" veneer lathes in which the peeling knife remains stationary during the peeling operation and the rotating block is continuously fed toward the knife. Accordingly, the scope of the invention is to be construed in accordance with the substance defined by the following claims.

What is claimed is:

1. A method of controlling the clearance angle of a veneer lathe knife in a veneer lathe having a knife holder beam rotatably mounted on a knife carrier, said method comprising the steps of:

(a) measuring vibration frequency of said beam;

(b) comparing said measured vibration frequency with a stored representation of a vibration frequency range characteristic of disruption of veneer peeling;

(c) if said comparison reveals that said measured vibration frequency is within said range characteristic of disruption of veneer peeling, rotatably adjusting said beam until said comparison reveals that said measured vibration frequency is not within said range characteristic of disruption of veneer peeling; and, (d) repeating steps (a) through (c) continuously throughout peeling of a block.

2. A method as defined in claim 1, wherein said rotatable beam adjustment further comprises reduction of said clearance angle.

3. A method as defined in claim 1 or 2, further comprising retarding change of said clearance angle toward a more negative angle to momentarily induce vibration of said beam within said range characteristic of disruption of veneer peeling and thereby determine a limiting value of said clearance angle.

4. A method as defined in claim 1 or 2, further comprising changing said clearance angle toward a more positive angle to momentarily induce vibration of said beam within said range characteristic of disruption of veneer peeling and thereby determine a limiting value of said clearance angle.

5. A veneer lathe comprising:

(a) a knife carrier slidably mounted for horizontal displacement relative to a peel block;

(b) a knife holder beam rotatably mounted on said carrier;

(c) a knife rigidly mounted on said beam;

(d) an actuator mounted between said knife carrier and said knife holder beam for rotatably positioning said beam relative to said carrier at a controllable positioning rate;

(e) a vibration detector mounted on said beam, said detector for producing an output signal representative of vibration frequency of said beam;

(f) a controller coupled between said vibration detector and said actuator, said controller for:
  (i) receiving and comparing said detector output signal with a stored representation of a vibration frequency range characteristic of disruption of veneer peeling; and,
  (ii) if said comparison reveals said beam vibration frequency is within said range characteristic of disruption of veneer peeling, outputting to said actuator a control signal to vary said beam positioning rate until said comparison reveals that said beam vibration frequency is not within said range characteristic of disruption of veneer peeling.

6. A veneer lathe as defined in claim 5, wherein said output control signal accelerates said beam positioning rate, thereby yielding a less positive value of said clearance angle.

* * * * *